Oct. 14, 1941.                 J. A. MERRILL                   2,259,348
                                  GOLF BALL
                             Filed Feb. 26, 1937

```
┌─────────────────────────────────┐
│   Mixing balata-like product    │
│    with rubber hydrochloride    │
└─────────────────────────────────┘
                 │
                 ▼
┌─────────────────────────────────┐
│  Molding the mixture below the  │
│   decomposition temperature     │
│   of the rubber hydrochloride   │
└─────────────────────────────────┘
```

Inventor
James A Merrill

By

Attorney

Patented Oct. 14, 1941

2,259,348

UNITED STATES PATENT OFFICE 2,259,348

GOLF BALL

James A. Merrill, Akron, Ohio, assignor to Wingfoot Corporation, Wilmington, Del., a corporation of Delaware Application February 26, 1937, Serial No. 127,980

5 Claims. (Cl. 273—62)

This invention relates to molded compositions of rubber hydrochloride and particularly golf balls having rubber hydrochloride covers. It has been found that the addition of balata or a balata-like material, such as a condensation derivative of rubber materially improved the molding properties of rubber hydrochloride and yields an improved molded product. Insulators, electrical apparatus, hardware specialties, trays, etc., may be molded from such a composition. It has been found to be a superior cover for golf balls. The invention will be described more particularly in connection with the formation of golf ball covers.

It has been found that golf balls covered with rubber hydrochloride compositions show a greater rebound than commercial balls of similar construction which contain no rubber hydrochloride and this added to the fact that rubber hydrochloride is tough and oil resistant and in other respects suitable for golf ball cover manufacture makes the golf balls of this invention superior to many now on the market.

The rubber hydrochloride may be made as described in Calvert U. S. Patent 1,989,632. A photochemical inhibitor such as hexamethylene tetramine or the other inhibitors described in the patent are advantageously added in small amounts such as there suggested. The rubber hydrochloride is advantageously compounded with other tough stock such as that previously employed in the manufacture of golf ball covers. For this purpose a substantial amount of balata or a balata-like material has been found advantageous because it improves the molding properties of the rubber hydrochloride. Pigments, etc., of the usual type may be added. The mechanical steps in the manufacture of the golf ball will not differ materially from those ordinarily employed and the usual golf ball centers may be used. The rubber hydrochloride stock may be dissolved in benzene or other suitable solvent to form a cement which may be applied to the golf ball center in any usual way and then after evaporation of the solvent the ball may be molded to shape. As an alternative method the golf ball cover composition may be molded into cups in the usual manner and these may be molded onto the golf ball center. The cover after application in either of these ways may be painted, if desired, and any of the usual golf ball cover treatments may be employed in the manufacture of the golf balls of this invention.

In preparing the golf ball cover composition the rubber hydrochloride may be admixed with balata or a condensation derivative of rubber prepared by the treatment of rubber with a condensing agent such as chlorostannic acid, tin tetrachloride, hydrofluoric acid, boron fluoride, per-acetic acid, sulfuric acid, sulfonic acids, sulfonyl chlorides, etc., as described in the prior art. For example, the condensation derivative of rubber may be prepared as described in Sebrell 2,052,423. The proportions of rubber hydrochloride and other ingredients may be varied somewhat without departing from the scope of this invention. A condensation derivative of rubber of higher melting point or lower melting point may be employed and the amount of rubber hydrochloride mixed with the condensation derivative of rubber may vary for example between about 5 and 100 parts of the condensation derivative of rubber to 100 parts of rubber hydrochloride. Similarly, with the other compounding ingredients such as balata, the proportions may vary. The cover may comprise both balata and gutta percha or a condensation derivative of rubber and gutta percha or balata and a condensation derivative of rubber. A small amount of rubber may be added as well as other ingredients commonly employed in the manufacture of golf ball covers. By including a substantial amount of rubber hydrochloride the rebound of the ball will be found to be improved. The following formulae are representative:

Example 1

|  | Parts |
|---|---|
| Rubber hydrochloride | 45 |
| Balata | 45 |
| Titanium dioxide | 10 |

Example 2

|  | Parts |
|---|---|
| Rubber hydrochloride | 40 |
| Condensation derivative of rubber | 40 |
| Rubber | 15 |
| Titanium dioxide | 17 |

In preparing the composition the pigment is advantageously mixed into balata or the condensation derivative of rubber or other material admixed with the rubber hydrochloride. The rubber hydrochloride may then be mixed into this composition on a rubber mill. The above formulae give good results when molded into cups which are subsequently molded onto the golf ball center in a manner well known in the art. When the composition is to be applied as a solution the various components of the composition may be separately or simultaneously dissolved in the solvent and the resulting solution employed in a well known manner. Any pigment employed may be advantageously dispersed in the balata or the condensation derivative of rubber before the latter is dispersed in the solvent in order to thus obtain a good dispersion of the pigment in the solvent.

The invention is illustrated by the accompanying drawing which shows a golf ball having a usual center 2 and a cover 1 which is composed of a rubber hydrochloride composition such as those herein disclosed. The cover preferably includes a material such as balata or a condensation derivative of rubber.

The properties of the golf balls of this invention will depend to some extent upon the composition of the golf ball cover. In general it may be said that they will give good distance and for toughness and other properties will depend upon the formulae employed.

What I claim is:

1. A thermoplastic molded rubber hydrochloride product which comprises balata dispersed therein.
2. A thermoplastic molded rubber hydrochloride product which comprises a condensation derivative of rubber dispersed therein.
3. A golf ball cover which comprises a substantial amount of rubber hydrochloride.
4. A golf ball with a cover which comprises balata and a substantial amount of rubber hydrochloride.
5. A golf ball with a cover which comprises a condensation derivative of rubber and a substantial amount of rubber hydrochloride.

JAMES A. MERRILL.